United States Patent
Ooba

(10) Patent No.: US 10,625,415 B2
(45) Date of Patent: Apr. 21, 2020

(54) ROBOT SYSTEM

(71) Applicant: FANUC CORPORATION, Yamanashi (JP)

(72) Inventor: Masafumi Ooba, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/003,800

(22) Filed: Jun. 8, 2018

(65) Prior Publication Data

US 2018/0370023 A1 Dec. 27, 2018

(30) Foreign Application Priority Data

Jun. 26, 2017 (JP) .................................. 2017-124170

(51) Int. Cl.
*B25J 9/00* (2006.01)
*B65G 43/08* (2006.01)
(Continued)

(52) U.S. Cl.
CPC ........... *B25J 9/0093* (2013.01); *B25J 9/1697* (2013.01); *B25J 15/0095* (2013.01); *B65G 61/00* (2013.01);
(Continued)

(58) Field of Classification Search
CPC .................................................... B25J 9/0093
See application file for complete search history.

(56) References Cited

U.S. PATENT DOCUMENTS 5,141,097 A * 8/1992 Oiry ....................... B65G 43/08
198/444
6,988,610 B2 * 1/2006 Fromme ................ B65G 43/02
198/502.1
(Continued)

FOREIGN PATENT DOCUMENTS

CN 106457573 A 2/2017
CN 106737662 A 5/2017
(Continued)

OTHER PUBLICATIONS

Japanese Office Action dated Nov. 6, 2018, in connection with corresponding JP Application No. 2017-124170 (10 pgs., including machine-generated English translation).
(Continued)

*Primary Examiner* — Thomas Randazzo
(74) *Attorney, Agent, or Firm* — Maier & Maier, PLLC

(57) ABSTRACT

A robot system provided with: a conveying apparatus; a robot that performs processing on an article being conveyed; a camera that captures images of the article being conveyed; a conveying-velocity calculating portion that calculates at least one of a position of the article on the conveying apparatus and a velocity at which the article is conveyed by the conveying apparatus on the basis of the plurality of images captured by the camera; and a control unit that controls the robot on the basis of at least one of the position and the conveying velocity. The control unit determines whether or not the article is present in the images, and, in the case in which the article is absent, controls the robot on the basis of at least one of the position and the conveying velocity calculated by the conveying-velocity calculating portion immediately therebefore.

4 Claims, 5 Drawing Sheets

(51) Int. Cl.
  *B25J 9/16* (2006.01)
  *B65G 61/00* (2006.01)
  *B25J 15/00* (2006.01)
  *G05B 19/418* (2006.01)

(52) U.S. Cl.
  CPC .......... *G05B 19/4182* (2013.01); *B65G 43/08* (2013.01); *B65G 2203/041* (2013.01); *G05B 2219/37563* (2013.01); *G05B 2219/40563* (2013.01)

(56) References Cited

U.S. PATENT DOCUMENTS

| | | | |
|---|---|---|---|
| 2002/0105296 A1 | 8/2002 | Okuyama et al. | |
| 2011/0082586 A1 | 4/2011 | Nishihara | |
| 2012/0236140 A1* | 9/2012 | Hazeyama | B25J 9/1697 348/94 |
| 2013/0223673 A1* | 8/2013 | Davis | G06K 9/78 382/100 |
| 2014/0022562 A1* | 1/2014 | Corsico Piccolino | G01D 5/34776 356/616 |
| 2014/0088765 A1* | 3/2014 | Valpola | B25J 9/1697 700/259 |
| 2016/0001983 A1* | 1/2016 | Ooba | B65G 37/00 414/787 |
| 2016/0103084 A1* | 4/2016 | Kleczewski | B65G 17/08 324/652 |
| 2016/0151916 A1* | 6/2016 | Kanno | B25J 9/1664 700/228 |
| 2017/0066133 A1 | 3/2017 | Ooba et al. | |
| 2017/0139407 A1 | 5/2017 | Sakaguchi et al. | |
| 2017/0144297 A1 | 5/2017 | Takaichi et al. | |
| 2017/0144301 A1 | 5/2017 | Washizu et al. | |
| 2017/0249491 A1* | 8/2017 | MacIntosh | G06Q 20/208 |
| 2018/0284738 A1* | 10/2018 | Menke | B62D 65/18 |
| 2018/0344573 A1* | 12/2018 | Hirano | B41J 11/007 |
| 2019/0202642 A1* | 7/2019 | Schroader | B65G 37/02 |
| 2019/0210813 A1* | 7/2019 | Wagner | B65G 23/44 |

FOREIGN PATENT DOCUMENTS

| | | |
|---|---|---|
| DE | 11 2009 001 414 T5 | 4/2011 |
| DE | 10 2010 043 057 A1 | 5/2012 |
| DE | 101 62 967 B4 | 8/2013 |
| DE | 10 2016 115 987 A1 | 3/2017 |
| EP | 3159120 A1 | 4/2017 |
| JP | H02-145291 A | 6/1990 |
| JP | H10-105217 A | 4/1998 |
| JP | 2009-028818 A | 2/2009 |
| JP | 2017-47511 A | 3/2017 |

OTHER PUBLICATIONS

Japanese Decision to Grant a Patent dated Jan. 8, 2019, in connection with corresponding JP Application No. 2017-124170 (6 pgs., including machine-generated English translation).

Office Action dated Jun. 21, 2019, in corresponding Chinese Patent Application No. 201810623023.6; 12 pages.

German Office Action dated Dec. 10, 2019, in connection with corresponding DE Application No. 10-2018-114-682.5 (19 pgs., including machine-generated English translation).

* cited by examiner ns the vicinity of the conveyor 2; a camera 4 that is installed,
ROBOT SYSTEM

CROSS-REFERENCE TO RELATED APPLICATIONS

This application claims the benefit of Japanese Patent Application No. 2017-124170, the content of which is incorporated herein by reference.

FIELD

The present invention relates to a robot system.

BACKGROUND

In the related art, there is a known robot system with which an article being conveyed by a conveyor or a mark made on the conveyor is imaged, the moving velocity of the article conveyed by the conveyor is detected on the basis of the obtained image, and the position of a robot hand is controlled in synchronization with the movement of the article, thereby gripping the moving article with the robot hand (for example, see Japanese Unexamined Patent Application, Publication No. 2009-28818).

With this robot system, in order to detect the moving velocity of the article being conveyed by the conveyor, when gripping the article with the robot hand, the robot is synchronized on the basis of the moving velocity of another article or mark imaged by an image acquisition means that is positioned on the conveyor on an upstream side of the gripping position, and thus, the articles or marks need to be supplied continuously.

SUMMARY

The present invention provides the following solutions.
An aspect of the present invention provides a robot system including: a conveying apparatus that conveys an article; a robot performs processing on the article being conveyed by the conveying apparatus; a camera that captures, at an upstream side of the robot in the conveying direction, images of the article being conveyed by the conveying apparatus; a conveying-velocity calculating portion that calculates at least one of a position of the article on the conveying apparatus and a velocity at which the article is conveyed by the conveying apparatus on the basis of the plurality of images captured by the camera at different times; and a control unit that controls the robot on the basis of at least one of the position and the conveying velocity calculated by the conveying-velocity calculating portion, wherein the control unit determines whether or not the article is present in the images acquired by the camera, and, in the case in which the article is absent, controls the robot on the basis of at least one of the position and the conveying velocity calculated by the conveying-velocity calculating portion immediately there before.

Another aspect of the present invention provides a robot system including: a conveying apparatus that conveys an article; a robot that performs processing on the article being conveyed by the conveying apparatus; a camera that captures, at an upstream side of the robot in the conveying direction, images of the article being conveyed by the conveying apparatus and a mark being moved by the conveying apparatus; a conveying-velocity calculating portion that calculates at least one of a position of the article on the conveying apparatus and a velocity at which the article is conveyed by the conveying apparatus on the basis of the plurality of images captured by the camera at different times; and a control unit that controls the robot on the basis of at least one of the position and the conveying velocity calculated by the conveying-velocity calculating portion, wherein the control unit determines whether or not the article and the mark are present in the images acquired by the camera, and, in the case in which the article and the mark are absent, controls the robot on the basis of at least one of the position and the conveying velocity calculated by the conveying-velocity calculating portion immediately there before.

DETAILED DESCRIPTION

A robot system 1 according to an embodiment of the present invention will be described below with reference to the drawings.

Figure 1:
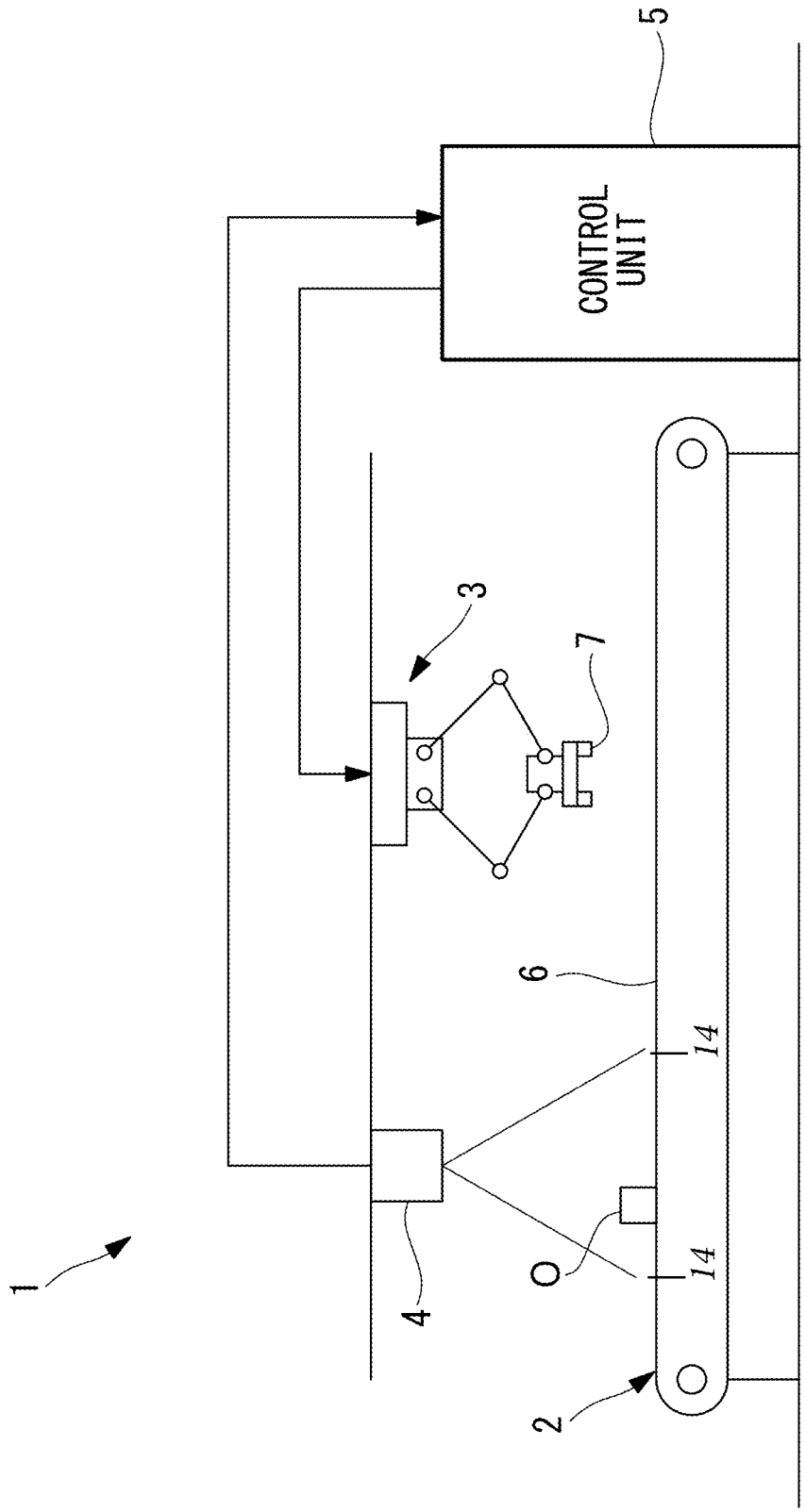
FIG. 1 is an overall configuration diagram showing a robot system according to an embodiment of the present invention.

As shown in FIG. 1, the robot system 1 according to this embodiment is provided with: a conveyor (conveying apparatus) 2 that conveys an article O; a robot 3 that is installed in the vicinity of the conveyor 2; a camera 4 that is installed, facing down, above the conveyor 2 at a position that is on an upstream side of the robot 3 in a conveying direction; and a control unit 5 that controls the robot 3 on the basis of images acquired by the camera 4.

The conveyor 2 is, for example, a belt conveyor, and is provided with a belt 6 on which the article O is placed and conveyed in one direction. The belt 6 is driven by a motor (not shown).

Although the robot 3 may be of an arbitrary type, such as a horizontally installed type, a suspended type, or the like, the robot 3 is, for example, of a type in which a robot hand 7 that can grip the article O is provided at a distal end of a wrist thereof.

The camera 4 has a viewing field that is fixed in a certain region of the conveyor 2 in the conveying direction, and acquires two-dimensional images of the article O being conveyed on the conveyor 2. The camera 4 captures the images at a frame rate at which the images of the article O are captured at least twice while that same article O passes through the viewing field.

Figure 2:
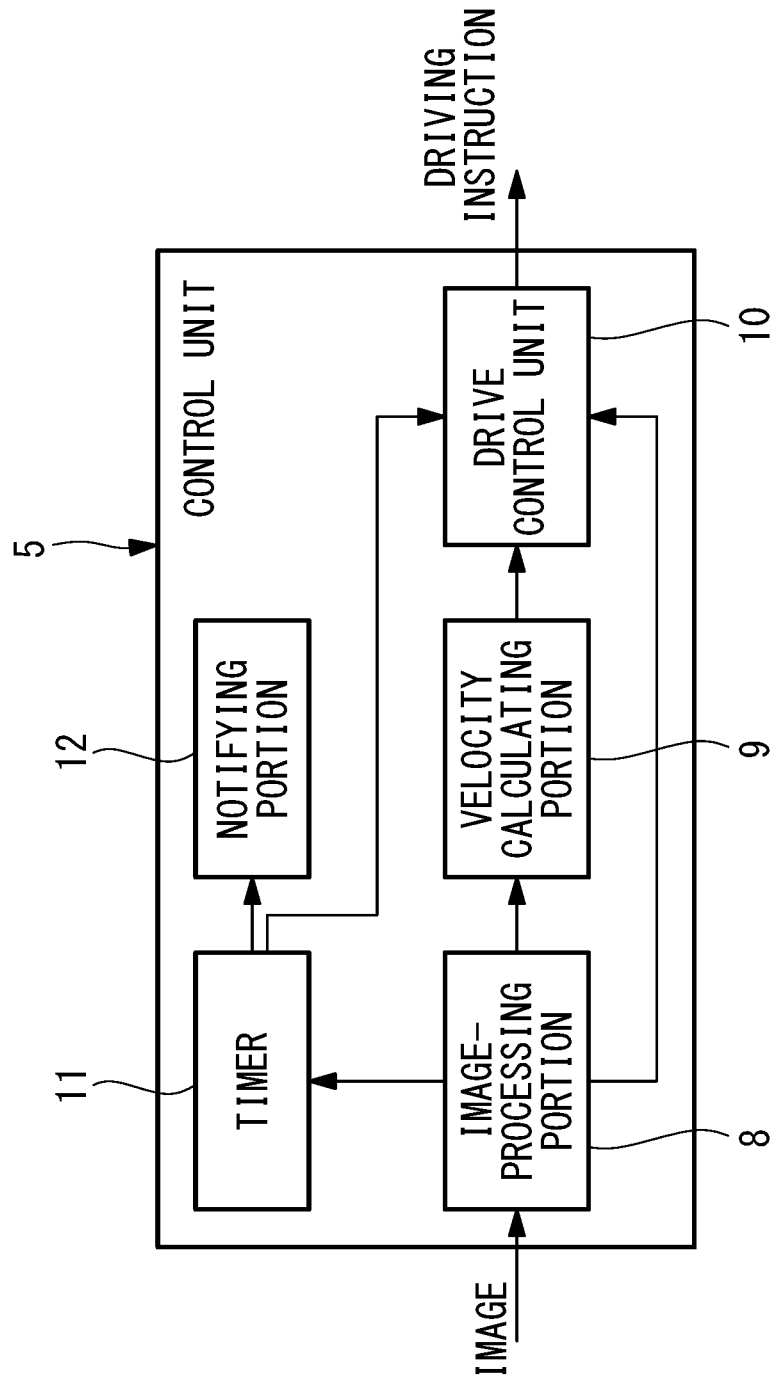
FIG. 2 is a block diagram showing a control unit provided in the robot system in FIG. 1.

As shown in FIG. 2, the control unit 5 is provided with: an image-processing portion (conveying-velocity calculating portion) 8 that recognizes the article O being conveyed by the conveyor 2 by processing the images acquired by the camera 4; a velocity calculating portion (conveying-velocity calculating portion) 9 that calculates the conveying velocity of the conveyor 2 on the basis of positions of the same article O recognized by the image-processing portion 8 on the basis of images acquired at different times; and a drive control unit (control unit) 10 that controls the robot 3 on the basis of the conveying velocity calculated by the velocity calculating portion 9.

The drive control unit 10 causes the robot 3 to be operated in accordance with an operating program taught thereto in advance, and causes the robot 3 to perform processing for gripping the moving article O and picking up the article O from the conveyor 2 by using the robot hand 7 attached to the distal end of the wrist thereof by executing tracking with which the article O on the conveyor 2 is followed on the basis of the conveying velocity calculated by the velocity calculating portion 9.

Figure 3:
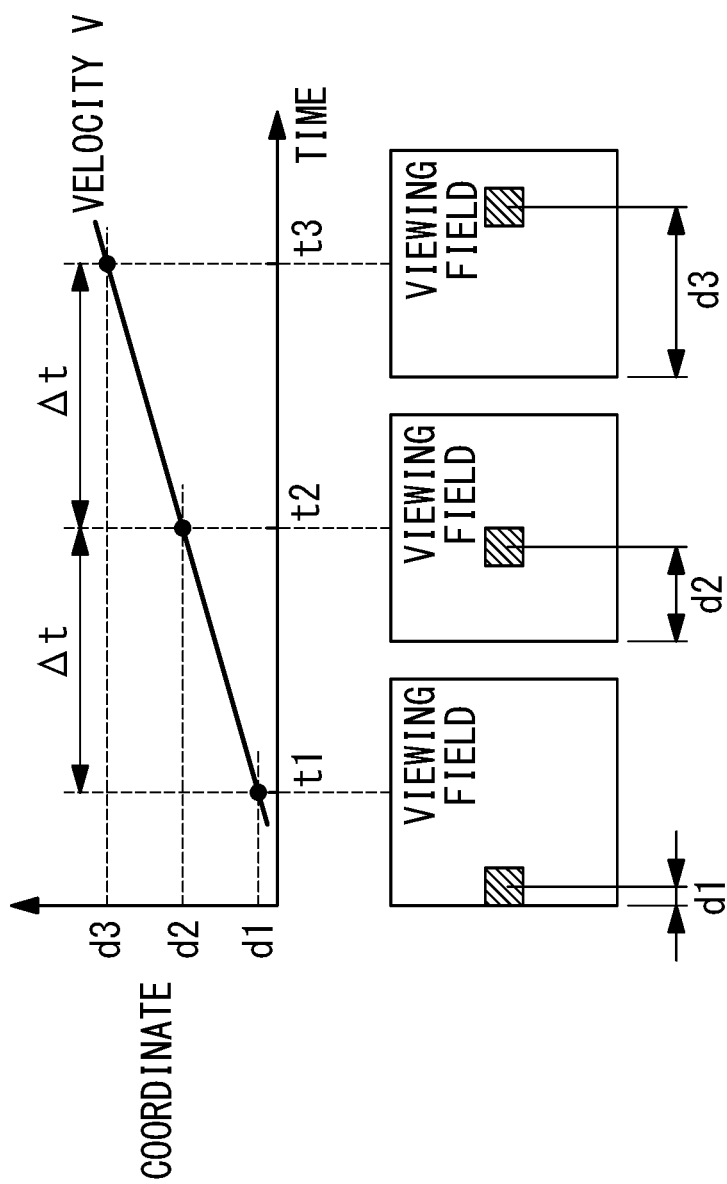
FIG. 3 is a diagram showing changes over time in images acquired by a camera of the robot system in FIG. 1 and the conveying velocity.

More specifically, for example, as shown in FIG. 3, when three images are acquired in the same viewing field at different times t1, t2, and t3 separated by a predetermined time interval $\Delta t$, the image-processing portion 8 recognizes, in the respective images, the articles O included in the images and calculates coordinate positions of the centers of gravity of the recognized articles O.

The velocity calculating portion 9 recognizes, as the same article O, the articles O having the centers of gravity positioned in the vicinity of the same coordinates in a direction orthogonal to the conveying direction in the images acquired adjacent to each other in the time-axis direction, and calculates the conveying velocity by dividing the differences among the coordinate values of the centers of gravity of the respective articles O in the conveying direction by the time interval $\Delta t$ for capturing the images. When the conveying velocity is calculated multiple times for the same article O, the average thereof or a value fitted by means of the least squares method or the like is output as the conveying velocity.

In addition, the control unit 5 is provided with a timer 11 and a notifying portion 12 that externally issues a notification of an abnormality on the basis of outputs from the timer 11.

The image-processing portion 8 determines whether or not a situation in which no article O is recognized in the images is occurring, and causes the timer 11 to start a clock when such a situation is occurring.

In addition, in the case in which the article O is detected again in the images after causing the timer 11 to start the clock, the image-processing portion 8 causes the clock of the timer 11 to be reset.

When the amount of time input thereto from the timer 11 exceeds a predetermined amount of time, the notifying portion 12 externally issues a notification indicating the occurrence of an abnormality. The notifying portion 12 may be an arbitrary notifying means such as a monitor, a lamp, a buzzer, or the like.

In addition, in the case in which no article O is recognized in the images, the image-processing portion 8 inputs this information to the drive control unit 10 in the form of an article-O absent signal. In the state in which the article-O absent signal has been input from the image-processing portion 8, the drive control unit 10 controls the robot 3 by using the conveying velocity that is finally input from the velocity calculating portion 9.

The operation of the thus-configured robot system 1 according to this embodiment will be described below.

With the robot system 1 according to this embodiment, when the article O is being conveyed by the conveyor 2, the camera 4 captures the images of the article O. The images acquired by image-capturing are transmitted to the image-processing portion 8 and are subjected to image processing, and thus, the article O is recognized and the coordinate positions of the center of gravity of the article O are calculated.

Then, as shown in FIG. 3, on the basis of coordinate positions d1, d2, and d3 of the center of gravity of the same article O, which are calculated on the basis of the images acquired at different times t1, t2, and t3 separated by the predetermined time interval $\Delta t$, the conveying velocity V of the conveyor 2 is calculated by the velocity calculating portion 9, and is input to the drive control unit 10. Because the camera 4 and the robot 3 are disposed at positions that are separated by a predetermined distance, when the conveyor 2 is moving at the same velocity, the article O moves into an operating area of the robot 3 when the amount of time obtained by dividing this distance by the conveying velocity V has passed.

The drive control unit 10 sets a tracking coordinate system TF by recognizing the position and orientation of the article O at one of the points in time at which the article O is present in the images, and calculates the amounts of movement by accumulating distances between positions of the center of gravity of the article O recognized until the current time starting from said point in time. Then, a current tracking coordinate system TF' is calculated by multiplying the tracking coordinate system TF by a coordinate transformation matrix having said amounts of movement as components thereof.

$$TF'=T \cdot TF$$

Thus, the drive control unit 10 can cause the robot hand 7 to be moved so as to follow, with reference to the calculated tracking coordinate system TF', the article O being conveyed by the conveyor 2, to grip the article O and to pick up the article O from the conveyor 2.

In this case, when the robot 3 is being driven so that the robot hand 7 follows the article O on the conveyor 2, because the camera 4 captures an image of the subsequent article O, and a new conveying velocity is calculated by the velocity calculating portion 9, the drive control unit 10 controls the robot 3 by using the newly calculated conveying velocity. By doing so, it is possible to correctly pick up the article O even if the conveying velocity of the conveyor 2 fluctuates.

In this embodiment, when a change occurs, from a state in which the article O is present in the images acquired by the camera 4, to a state in which the article O is absent therein, the image-processing portion 8 causes the timer 11 to start the clock, and, in the case in which no article O is recognized in the images, outputs the article-O absent signal, which gives a notification of this fact, to the drive control unit 10.

When the article-O absent signal is received, the drive control unit 10 controls the robot 3 by continuing to use the conveying velocity that has been used immediately there before. By doing so, it is possible to pick up, from the conveyor 2, the article O that has been conveyed into the operating area of the robot 3 without stopping the robot 3.

Also, in the case in which the amount of time input from the timer 11 exceeds the predetermined amount of time, the notifying portion 12 externally issues a notification indicating the occurrence of an abnormality. By doing so, an operator can recognize the occurrence of the abnormality. In addition, in the case in which the amount of time input from the timer 11 exceeds the predetermined amount of time, the drive control unit 10 stops the operation of the root 3. By doing so, there is an advantage in that it is possible to prevent the work performed by the robot 3 to pick up the article O from being continued without calculating a new conveying velocity.

Note that, in this embodiment, although the conveying velocity of the conveyor 2 is calculated on the basis of changes in the positions of the article O being conveyed by the conveyor 2, alternatively, marks 14 may be provided on a surface of the conveyor 2 at appropriate intervals, and the conveying velocity may be calculated on the basis of changes in the positions of the marks 14 by recognizing the marks 14 included in the images acquired by the camera 4.

In this case, although the marks 14 are continuously supplied into the viewing field of the camera 4 in a more reliable manner as compared to the case of the article O, even with this case, there are cases in which the marks 14 are not detected because the marks come off or are hidden by the article O, or because temporary environmental changes occur due to ambient light or the like. With this embodiment, even in such cases, it is possible to continue the work of picking up the article O without stopping the robot 3, and thus, there is an advantage in that it is possible to enhance the work efficiency of the robot 3.

Figure 4:
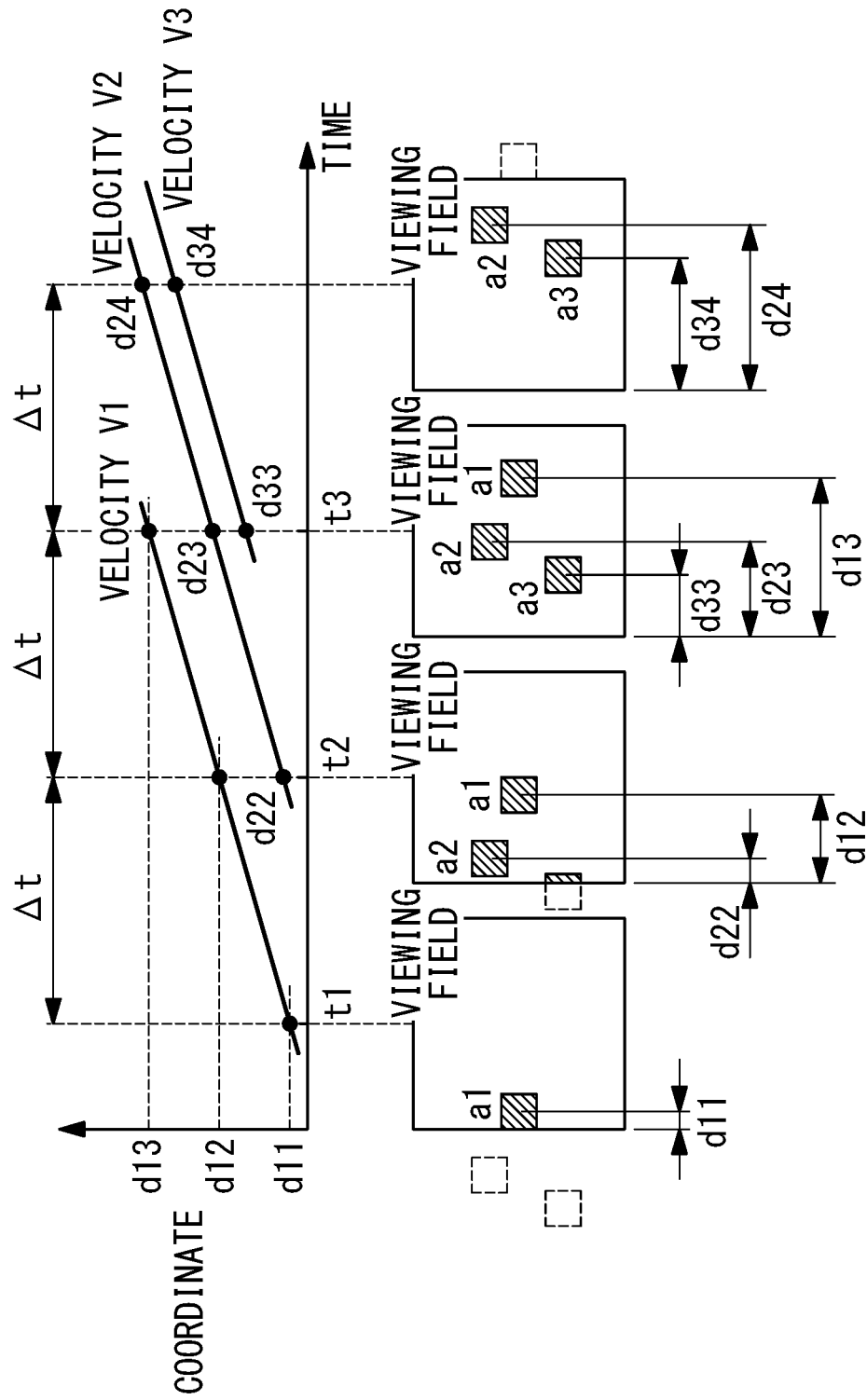
FIG. 4 is a diagram similar to FIG. 3 for a case in which images of a plurality of articles are captured in the same viewing field in the robot system in FIG. 1.

In addition, in this embodiment, although the case in which the single article O is detected in the images has been described, alternatively, as shown in FIG. 4, it is possible to apply the present invention to a case in which a plurality of articles a1, a2, and a3 are simultaneously placed in the viewing field of the camera 4.

In other words, in the case in which the plurality of articles a1, a2, and a3 are recognized in the images, for the respective articles a1, a2, and a3, the sameness with respect to the articles a1, a2, and a3 in the images acquired at different times may be determined, and the conveying velocity may be calculated by averaging velocities V1, V2, and V3 separately calculated on the basis of the movement distances among the articles a1, a2, and a3 determined to be the same. In this case, the movement distances of the same articles a1, a2, and a3 are determined, respectively, on the basis of differences in coordinate positions d11, d12, and d13, coordinate positions d22, d23, and d24, and coordinate positions d33 and d34 of the centers of gravity of the same articles a1, a2, and a3, which are calculated on the basis of the images acquired at different times t1, t2, and t3 separated by the predetermined time interval $\Delta t$.

Figure 5:
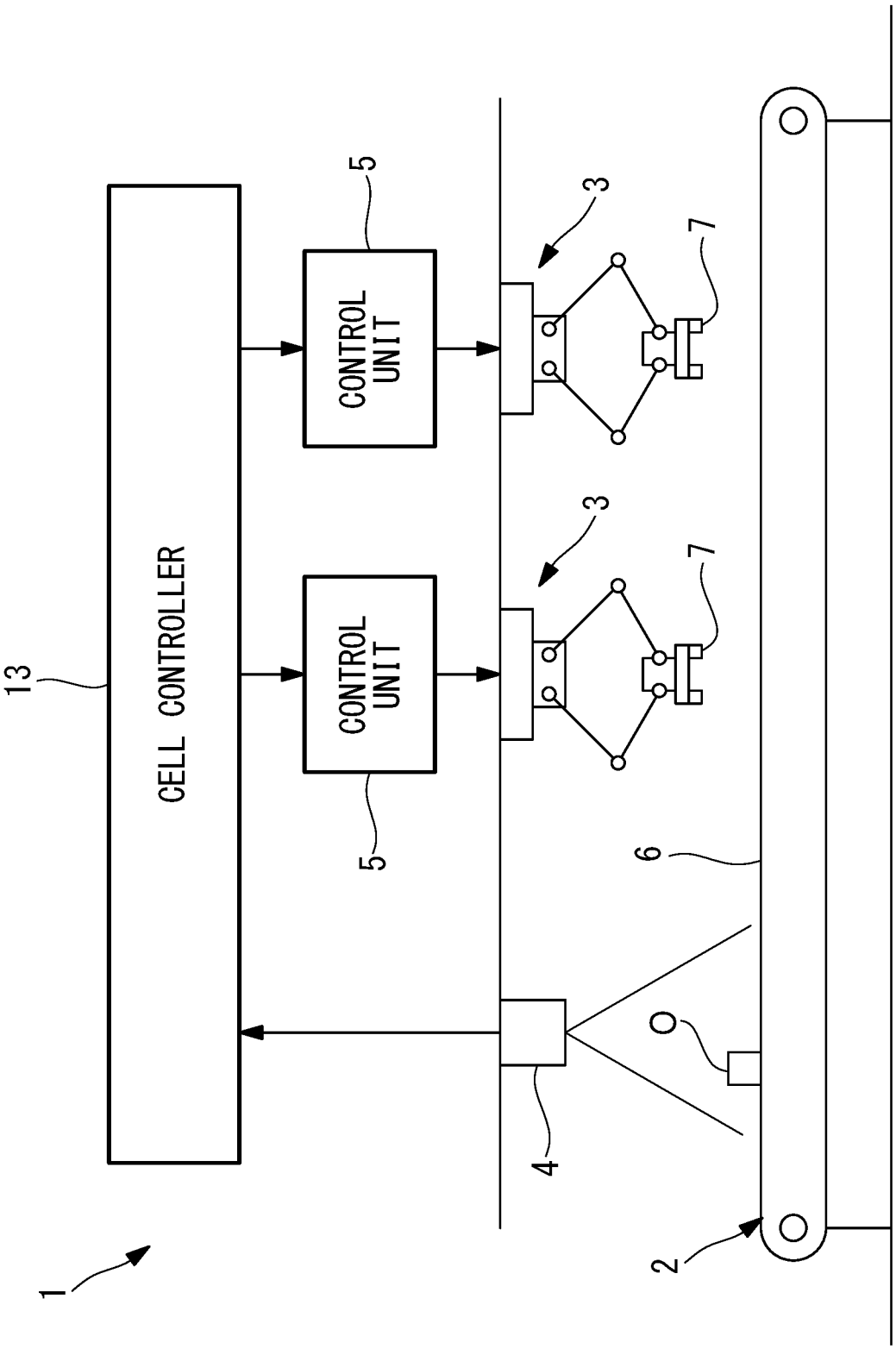
FIG. 5 is an overall configuration diagram showing a modification of the robot system in FIG. 1.

In addition, in this embodiment, although an example in which the single robot 3 is controlled has been described; alternatively however, as shown in FIG. 5, multiple robots 3 may be disposed along the conveying direction of the conveyor 2, and the control units 5 therefor may be connected to a high-level cell controller 13.

In the case where multiple robots 3 are used to perform work on the articles O being conveyed on the same conveyor 2, it is possible to manage, at one place, the conveying velocity of the conveyor 2 calculated on the basis of the images captured by the single camera 4.

In the case in which the conveying velocity of the conveyor 2 are managed by the control units 5 of the respective robots 3, it is necessary to synchronize the management thereof among the control units 5, and an error may occur due to the influence of delays in communication, etc.; however, by performing the management by means of the cell controller 13, it is possible to prevent the occurrence of such a problem.

In addition, in this embodiment, although the case in which the article O being conveyed by the conveyor 2 is gripped and picked up has been described as an example, alternatively, the invention may be applied to a case in which other arbitrary processing is applied to the article O being conveyed.

From the above-described embodiments and modifications thereof, the present invention provides the following solutions.

An aspect of the present invention provides a robot system including: a conveying apparatus that conveys an article; a robot that performs processing on the article being conveyed by the conveying apparatus; a camera that captures, at an upstream side of the robot in the conveying direction, images of the article being conveyed by the conveying apparatus; a conveying-velocity calculating portion that calculates at least one of a position of the article on the conveying apparatus and a velocity at which the article is conveyed by the conveying apparatus on the basis of the plurality of images captured by the camera at different times; and a control unit that controls the robot on the basis of at least one of the position and the conveying velocity calculated by the conveying-velocity calculating portion, wherein the control unit determines whether or not the article is present in the images acquired by the camera, and, in the case in which the article is absent, controls the robot on the basis of at least one of the positions and the conveying velocity calculated by the conveying-velocity calculating portion immediately there before.

With this aspect, when a plurality of articles are being conveyed by the conveying apparatus, the camera successively captures the images of the articles, and at least one of the positions of the articles on the conveying apparatus and the conveying velocities are calculated by the conveying-velocity calculating portion on the basis of the plurality of acquired images. Because the camera is disposed at the upstream side of the robot, the articles that have passed through the viewing field of the camera are supplied to the robot. At this time, if a subsequent article is present in the viewing field of the camera, by calculating the conveying velocity and the position of said article, it is possible to perform the processing on the moving article by causing the robot to be operated so as to follow the movement of the article on the basis of at least one of the calculated position and the calculated velocity, because said conveying velocity is equal to the moving velocity of the article being supplied to the robot.

In this case, in the state in which an article to be processed is being supplied to the robot, in the case in which the article is not present in the viewing field of the camera, the position and the conveying velocity of the article at that point in time is not calculated; however, with this aspect, because the control unit controls the robot on the basis of at least one of the position and the conveying velocity calculated immediately before the article disappears from the viewing field of the camera, it is possible to continue to perform the processing on the moving article by causing the robot to be operated without being stopped.

In the above-described aspect, the control unit may cause a clock to be started when it is determined that the article is absent in the images acquired by the camera, and in the case in which it is determined that the article is continuously absent in the images over a predetermined amount of time, may cause a notification indicating this fact to be issued.

By doing so, in the case in which an article is not supplied for the predetermined amount of time or more, because an abnormality may have occurred on the supply side, it is possible to issue a notification about the occurrence of the abnormality by issuing a notification about the fact that images of the article are not being captured.

In the above-described aspect, the camera may capture images at a frame rate at which it is possible to capture the same article being conveyed by the conveying apparatus at least twice.

By doing so, by capturing the images of the same article at least twice in the same viewing field, it is possible to calculate, in a simple manner, the velocity at which the article is being conveyed by the conveying apparatus on the basis of amounts of changes in the position of the article in the respective images.

In the above-described aspect, the conveying-velocity calculating portion may output, in the form of the conveying velocity, an average of the velocities calculated for at least two of the articles.

By doing so, in the case in which the plurality of articles are present in the same viewing field, it is possible to precisely calculate the conveying velocity by using, as the conveying velocity, the average of the velocities that are separately calculated for these articles.

In the above-described aspect, the control unit may stop the operation of the robot when the notification is issued about the continuous absence of the article for the predetermined amount of time.

By doing so, it is possible to prevent continued use of a conveying velocity employed without detecting the article.

Another aspect of the present invention provides a robot system including: a conveying apparatus that conveys an article; a robot that performs processing on the article being conveyed by the conveying apparatus; a camera that captures, at an upstream side of the robot in the conveying direction, images of the article being conveyed by the conveying apparatus and a mark being moved by the conveying apparatus; a conveying-velocity calculating portion that calculates at least one of a position of the article on the conveying apparatus and a velocity at which the article is conveyed by the conveying apparatus on the basis of the plurality of images captured by the camera at different times; and a control unit that controls the robot on the basis of at least one of the position and the conveying velocity calculated by the conveying-velocity calculating portion, wherein the control unit determines whether or not the article and the mark are present in the images acquired by the camera, and, in the case in which the article and the mark are absent, controls the robot on the basis of at least one of the position and the conveying velocity calculated by the conveying-velocity calculating portion immediately there before.

ADVANTAGEOUS EFFECTS OF INVENTION

The present invention affords an advantage in that it is possible to execute tracking performed by a robot even in a situation in which articles are not supplied continuously.

BRIEF DESCRIPTION OF DRAWINGS

Reference Signs List 1 robot system
2 conveyor (conveying apparatus)
3 robot
4 camera
8 image-processing portion (conveying-velocity calculating portion)
9 velocity calculating portion (conveying-velocity calculating portion)
10 drive control unit (control unit)
O, a1, a2, a3 article

The invention claimed is:

1. A robot system comprising:
   a conveying apparatus that conveys an article;
   a robot that performs processing on the article;
   a camera that captures, at an upstream side of the robot in the conveying direction, images of the article being conveyed by the conveying apparatus and a mark being moved by the conveying apparatus;
   a conveying-velocity calculating portion that calculates at least one of a position of the article and a velocity at which the article is conveyed on the basis of the plurality of images captured by the camera; and
   a control unit that controls the robot on the basis of at least one of the position and the conveying velocity calculated by the conveying-velocity calculating portion,
   wherein the control unit determines whether or not the article and the mark are present in the images acquired by the camera, and, controls the robot on the basis of at least one of the position and the conveying velocity calculated by the conveying-velocity calculating portion when the article and the mark are absent, and
   wherein the conveying-velocity calculating portion outputs, in the form of the conveying velocity, an average of the velocities calculated for at least two of the articles.

2. A robot system according to claim 1, wherein the control unit causes a clock to be started when it is determined that the article is absent in the images acquired by the camera, and in the case in which it is determined that the article is continuously absent in the images over a predetermined amount of time, causes a notification indicating this fact to be issued.

3. A robot system according to claim 1, wherein the camera captures the images at a frame rate at which it is possible to capture the same article being conveyed by the conveying apparatus at least twice.

4. A robot system according to claim 2, wherein the control unit stops the operation of the robot when the notification is issued about the continuous absence of the article over the predetermined amount of time.

* * * * *